Jan. 8, 1957  E. A. BOYAN  2,776,867
PRODUCTION ANALYSIS APPARATUS
Filed June 28, 1952  3 Sheets-Sheet 1
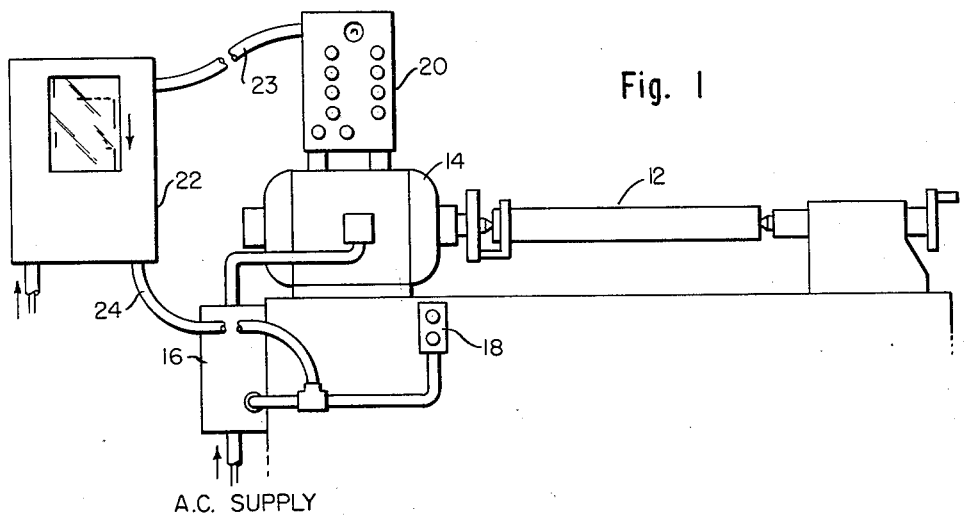
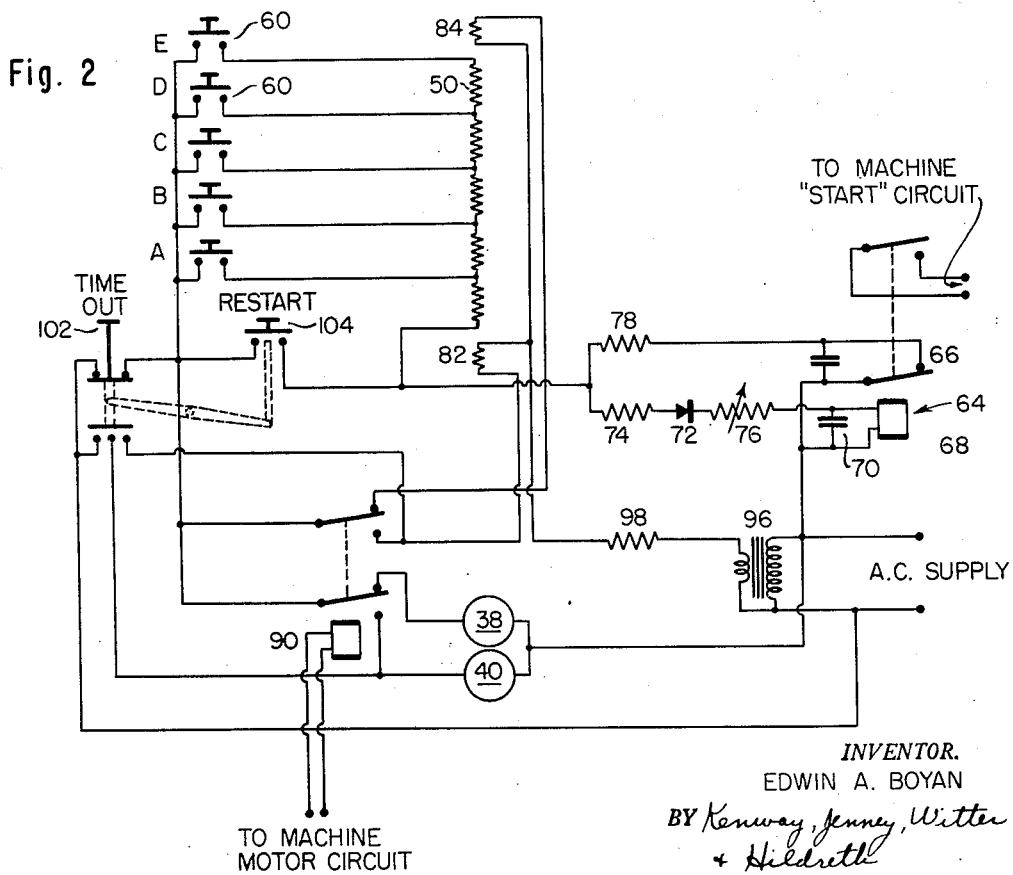
*INVENTOR.*
EDWIN A. BOYAN
BY Kenway, Jenney, Witter
 & Hildreth
ATTORNEYS

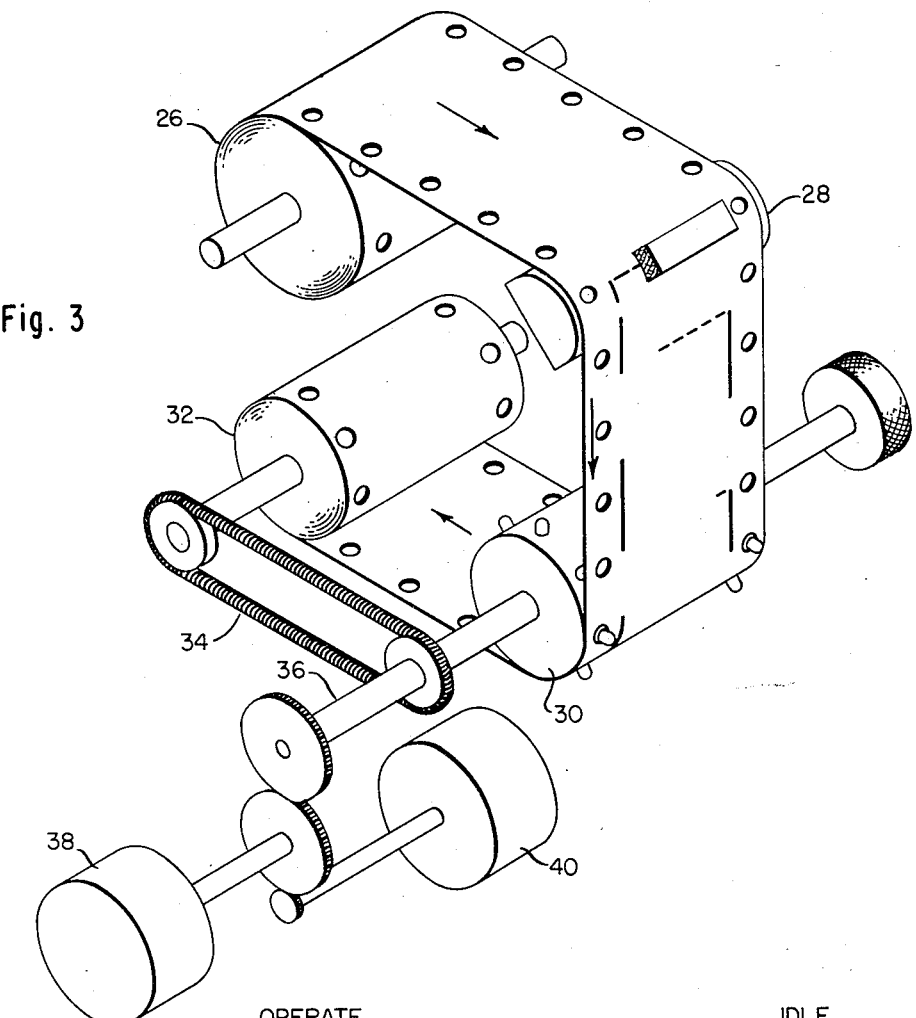

Jan. 8, 1957
E. A. BOYAN
2,776,867
PRODUCTION ANALYSIS APPARATUS
Filed June 28, 1952
3 Sheets-Sheet 3
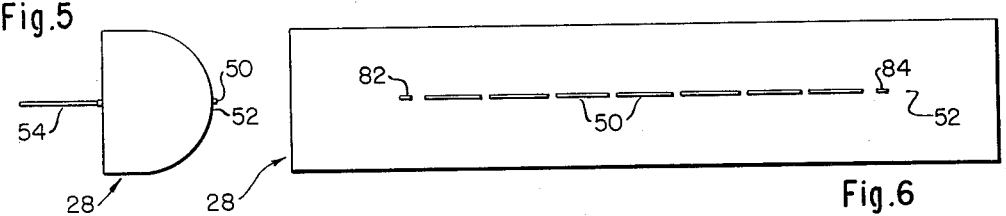
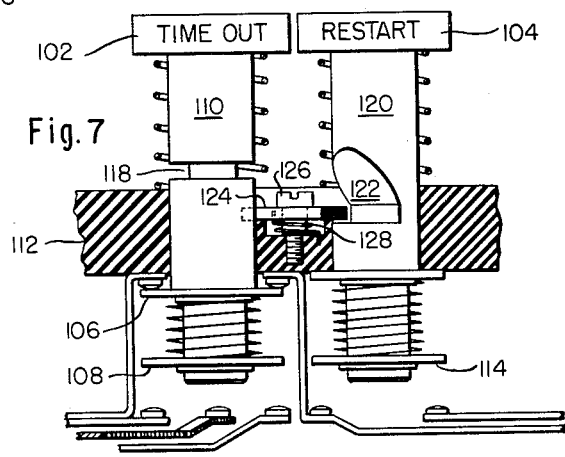
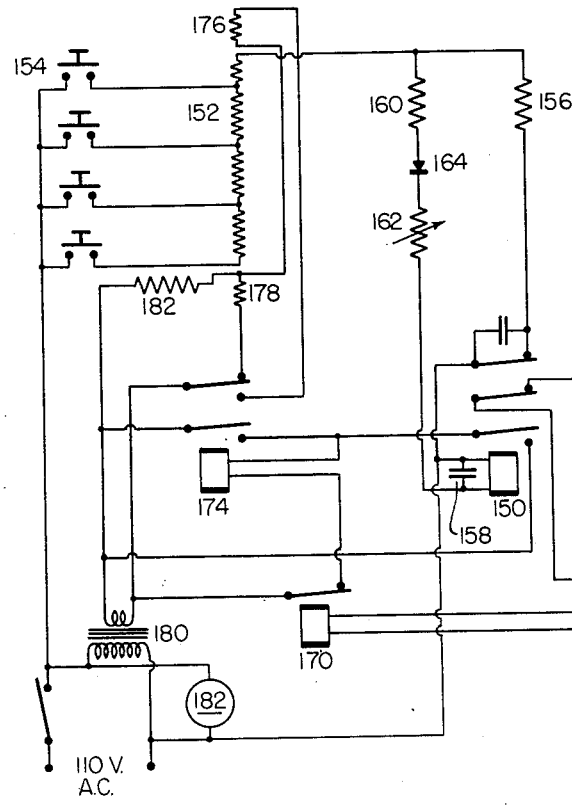
*INVENTOR.*
EDWIN A. BOYAN
BY Kenway, Jenney, Witter
& Hildreth
ATTORNEYS

United States Patent Office 2,776,867
Patented Jan. 8, 1957

2,776,867

PRODUCTION ANALYSIS APPARATUS

Edwin Arthur Boyan, Dayton, Ohio

Application June 28, 1952, Serial No. 296,200

4 Claims. (Cl. 346—25)

The present invention relates to recording apparatus, and more particularly although by no means exclusively to apparatus for recording the operation and production of machines and processes, for purposes of production control. In its application to production analysis apparatus, the invention is concerned with improvements in apparatus of the general type disclosed in my prior Patent No. 2,591,124, granted April 1, 1952.

There are many applications where it is desirable to provide recording means by which information may readily be transcribed for subsequent use, with time intervals or duration concurrently entered as part of the record. Thus, for the effective analysis and control of production costs and machine productivity in industrial management, it is necessary to have accurate and comprehensive information concerning the operation of the machines, particularly as to the variations or interruptions in normal operation. Upon proper analysis of the nature and significance of the various types of interruptions, it will generally be possible to eliminate or minimize at least some of the recurring interruptions.

In carrying out such an analysis of machine operation it is necessary to provide means for readily identifying on the recording medium the particular causes for interruptions as well as the durations thereof. It is essential, however, that the operation of such recording equipment not interfere with the normal production of the machine, so that the operator is burdened and his productivity decreased. On the other hand, the recording apparatus must not appear to the operator as a monitor by which the operator is kept under constant surveillance.

It is therefore an object of the present invention to provide apparatus which will permit pertinent information to be derived concerning the operation of a machine or other equipment, including particularly the nature and magnitude of delays or interruptions beyond his direct control, and wherein the actuation of the recording apparatus is in part automatic and in part dependent on the operator, with such actuation of the recording mechanism as the operator must perform being readily carried out without adding to the work of operating the machine.

More particularly, it is an object of the invention to provide production analysis apparatus wherein the operator may designate, by selection of a push button or analogous control means, the cause of an interruption in machine operation, the designation of the particular cause being accomplished at the end of a period of interruption and in the course of restarting the machine, with special supplementary control means provided for actuation by the operator at the commencement of a period of interruption whenever the operator decides on his own part to interrupt the operation of the machine without specific cause, to permit resumption of machine operation thereafter without requiring the actuation of cause-recording means and automatic designation of the interval involved.

It is likewise an object of the invention to provide a novel and effective means for substantially instantaneously recording data, particularly suited to recording on a moving web or the like.

These and other objects, and the several features of the invention, will become apparent from the following description, taken in conjunction with the accompanying drawings in which Fig. 1 is a view illustrating one form of my recording apparatus as embodied in production analysis apparatus installed on a lathe-type machine; Fig. 2 is a schematic wiring diagram of one form of recording apparatus for production analysis; Fig. 3 is an oblique view illustrating the data-recording mechanism of the invention; Fig. 4 is a view, partly in section, showing the recording element or head for transcribing data on the record web; Fig. 5 is an end view of the recording head; Fig. 6 is a top plan view of the same; Fig. 7 is a detail view, partly in section, showing the construction of a special control switch for use with the recording apparatus, and Fig. 8 is a schematic wiring diagram of an alternative embodiment of the recording apparatus for production analysis.

The recording apparatus of my invention is illustrated as embodied in units which may be attached to or mounted in the vicinity of the machine, with suitable connections made to the existing machine control circuit by means of electrical cables or conduit. Fig. 1 illustrates the use of the recording apparatus in conjunction with a lathe, only so much of the machine being shown as is necessary to indicate the relationship of the recording apparatus to the machine itself. In this schematic showing of the machine, the work 12 is driven by a motor 14 associated with the head-stock of the lathe, the power to the motor being handled by the usual relay, not shown, contained in housing 16. In the absence of the recording apparatus of the invention, the motor relay is under the control of start and stop buttons mounted in box 18 in a location convenient to the machine operator.

The recording apparatus is preferably arranged in two units. One unit, containing the pushbuttons for the control of the recording apparatus, is mounted on the machine. In the illustrative embodiment, the pushbutton panel 20, shown on a somewhat enlarged scale relative to the machine itself for purposes of clarity, is mounted on the head-stock. The recording unit 22, which comprises the record-receiving web with its feeding and recording mechanism, may be mounted wherever convenient in the vicinity of the machine, or even at some remote point if desired. A cable 23 connects the recorder unit to the control panel, and a connection is made by cable 24 to the control circuit for the motor relay in housing 16.

The control panel 20 is provided with a number of pushbuttons adapted to be marked with legends designating specific causes for interruption in machine production, the buttons when actuated being arranged to produce on the record-receiving web of the recorder unit 22 appropriate marks identifying the particular cause designated by that button. Actuation of the buttons likewise provides control of the operation of the machine, not only to simplify the operation of the recording equipment but also to insure that the operator will utilize the recorder.

The recording unit 22 includes driving means for advancing the web at a timed rate of advance, the driving mechanism being illustrated in schematic fashion in Fig. 3. As shown in this figure, the web of marginally-perforated paper is drawn from its supply roll 26 over the recording head 28 to be described, the web being positively advanced by means of sprocket drum 30. The web take-up is at roll 32 which is driven by a slippable belt 34 from the sprocket shaft 36. In the illustrative embodiment, a two-speed drive is provided through the use of two synchronous-type drive motors 38 and 40. These motors may be of standard type employing built-in overrunning clutch mechanism in the gear trains so that when one motor is energized to drive the web, the other is automatically disengaged. Thus, when the web is to be advanced at slow speed, the motor 40 is energized, while during periods when intervals are to be timed with greater accuracy, the motor 40 is de-energized and motor 38 activated to advance the web at the faster of the two speeds.

The marking of the web with appropriate data is arranged to be carried out electrically, by marking means mounted in the recording head 28 illustrated in Figs. 4, 5 and 6. The paper employed in the web is of a type sensitive to heat, the paper having been treated so as to turn dark or black in the immediate vicinity of the region where heat is applied. To mark the paper with appropriate data, the recording head is provided with a plurality of heating elements in the form of resistance units having sections 50 exposed in aligned fashion across the ridge portion 52 at the apex of the head.

The heating elements are made of thin wires or ribbons of metal of composition customarily employed for resistance and heating units operating at high temperature. To secure the resistance elements in place and to make effective electrical contact without soldering or welding, the resistance elements are bent into the form of U-shaped members, the legs of the U being inserted in holes formed in the material of the head, which material is of suitable insulating nature. The resistance elements are secured in place by means of locking members 54 having a portion of their lengths crimped as indicated at 56 so that when the smooth end of the connectors is inserted at the top of the head and drawn down into the passages in the space between the legs of adjacent heating elements, the crimped portions 56 bear against the heating elements and provide good electrical contact while at the same time mechanically locking the heating elements in place. The portions 54 of the connectors exposed below the head, serve as taps for connection to the source of electricity by which one or more of the heaters may be energized to mark on the moving web lines whose width transversely of the web is determined by the number of heating units energized at that moment.

The energization of the heating elements under the control of the pushbuttons, and the interrelation of the machine and the recording apparatus, are accomplished by means of the circuit arrangement shown in Fig. 2. In this diagram, the cause-recording pushbuttons are indicated at 60 and for purposes of explanation the different buttons are designated by the letters A, B, C, D and E, representing particular causes apt to be encountered by the machine with which the equipment is associated. The main heating unit of the recorder head is indicated by the resistance sections 50, the different sections being connected to their respective pushbuttons so that the number of sections energized depends on which button is actuated by the operator. The various sections of the heater strip are normally de-energized while the paper web is drawn over the recording head.

To insure that the heating units will be properly energized when a mark is to be placed on the web, means are provided by which the heating and therefore the intensity of the mark on the paper may be made wholly independent of the manner in which the operator actuates the pushbutton. To this end, the pushbuttons are arranged to control a circuit by which a pulse of current of predetermined intensity and duration is applied to one or more of the heater sections, depending on which pushbutton is pressed, so as to provide practically instantaneous marking of the web and thereby leave a clean mark even though the web may be advancing at a relatively rapid rate. Furthermore, such automatic control of the heaters insures that the heaters may not inadvertently become burned out through holding the heating current on an unnecessarily long time, as might be the case if the pushbuttons were directly in control of the application of heating current to the resistance elements. At the same time that the pushbuttons are actuated to mark the record web and thereby identify the nature of the interruption, the machine is automatically restarted, this coordination of machine restart and cause recording being in accordance with the teachings of my prior Patent No. 2,591,124 above referred to.

To time the pulse applied to the heaters when a pushbutton is actuated, a relay 64 having one set of contacts 66 in series with the A. C. supply to the heater unit is provided, as shown in Fig. 2. The solenoid 68 of the relay is likewise connected so that a portion of the current to the heater goes through the solenoid winding to energize the relay and open contacts 66, thereby interrupting the supply of current to the heaters 50. The actuation of the relay 64 is delayed a predetermined amount of time after a pushbutton is pressed, by the provision of a condenser 70 connected across the relay solenoid 68. A rectifier 72 and fixed and variable resistors 74 and 76 are likewise included in the delay circuit to control the charging time of the condenser and therefore the time when the relay operates to open contacts 66.

In describing the operation of the delay circuit, assume that pushbutton C is pressed by the operator to indicate a particular cause for an interruption. Current flows through the closed contact 66 through a dropping resistor 78 to the heater unit in the recording head, the first three sections of the heater receiving the current flow. At the same time current flows into the condenser 70 to build up a charge thereon, the rectifier 72 serving to convert the alternating current to direct current so as to charge the condenser with unidirectional current. Depending on the setting of resistor 76, the charge rapidly builds up on condenser 70 so that the condenser no longer constitutes in effect a short circuit across the windings of solenoid 68. Thereupon current flows through the relay to open contacts 66 and thereby interrupt the flow of current through the heating units of the recording head.

In practice it has been found effective to adjust the control resistor 76 so that the heating elements are brought to a relatively high temperature in a fraction of a second, so as to mark the paper almost instantaneously upon actuation of the pushbutton. The control of the heating current by the time delay circuit is sufficiently precise so that a relatively heavy heating current may be passed through the resistance wire of the recording head, substantially in excess of what the wire could carry without burning out, if the current were to be maintained more than the brief interval of the timed pulse. Because of the timing circuit, the heating current is not affected by the length of time the operator holds the pushbutton down; once the button has been pressed and the solenoid actuated, the solenoid remains energized with contacts 66 held open. Upon release of the pushbutton, the heater circuit is broken, the condenser 70 discharges through the solenoid 68 and contacts 66 reclose.

In the illustrative embodiment, the relay 64 includes a second pair of contacts, normally open, which are adapted to be connected to the start circuit of the machine in place of the start button contained in control box 18 of the normal motor controlled circuit. As a result, the normal start button is disabled from operation and the operator is dependent on actuation of one or another of the cause recording buttons in order to restart the machine following a stoppage.

To provide further information concerning the operation of the machine being monitored, means are provided for indicating when the machine is operating normally and the duration of the periods when the operation is interrupted. Such indications are provided by supplementary marking heaters mounted at each end of the cause recording heater sections. One heater unit, indicated at 82, is energized whenever the machine is operating normally, while the other heater 84 is energized during idleness periods of the machine.

The energization of one or the other of these marking heaters, as well as the control of the two-speed drive for the web advance, is under the control of a relay 90, the solenoid of which is connected in parallel with the machine motor circuit so that the relay is energized whenever the machine motor is in operation and de-energized when the machine stops. One set of double pole contacts of the relay serves to select the drive motor for the web, the lower speed drive motor 40 being energized during normal operation of the machine while the higher speed drive 38 is energized during idleness periods in order that the delay time may be more accurately computed from the web record.

The other set of contacts of the relay 90 is arranged to cause current to be applied either to the idleness marking unit 84 or the operate unit 82 depending on the machine status. Since one or the other of these heating units may be energized for appreciable periods of time, the current must not exceed that within the capability of the resistance wire to handle continuously. Accordingly, the power supply for these two heaters is provided by a step-down transformer 96 with a suitable value of series resistance 98 to provide the right amount of heat for legible marking of the heat sensitive paper.

The data-recording means, as actuated by the interconnected restart circuit for the machine, serves to record the usual types of interruptions and their causes and duration, the push buttons bearing legends appropriate to the types of delays encountered by the particular machine with which the equipment is associated. Thus, whatever be the reason for stopping the machine, the record immediately begins to designate idle time, and continues to do so until the machine is restarted upon pushing a cause recording button to designate the reason for that particular interruption.

There may, however, be times when the operator prefers to cease operation for a period without the necessity for designating a reason upon resuming operation, or without indicating that there has been a break in this operation. This requires that he must be able to restart the machine without recourse to the combined cause-recording and restart pushbutton switches. The ability to do this, without affecting the utilization of the apparatus to record delays and interruptions to which attention should be directed, and particularly those for which management may be responsible, is helpful in taking the apparatus out of the watchdog or constant surveillance category that is apt to be resented by the operators.

To permit this mode of operation when the operator deems it desirable, the apparatus is provided with special control means. This control, termed the Time Out control, is provided by supplemental push buttons 102, 104, the button 102 bearing the designation "Time Out," while the button 104 is the restart control for terminating a time-out period. These special control buttons are provided with a mechanical interlock, such interlock being shown schematically in Fig. 2 and a particular embodiment, for purposes of illustration only, being shown in detail view, Fig. 7.

The function of the time-out button is to permit the machine to be stopped without energizing the idle-marking heater element 84 to show idle time. Accordingly, the time-out switch is provided with contacts which, when the time-out button is pressed by the operator after stopping the machine by the regular stop button at control box 18, take over the function of relay 90 to maintain marking current through the "operate" marker coil 82 just as if the machine were continuing in normal operation. Once the time-out button has been pressed for this purpose, the switch remains closed so long as the operator elects to continue this unaccounted-for time out period. At the end of such period, to restart the machine he pushes the restart button associated with the time-out switch, thereby energizing solenoid 64 in control of the machine start circuit. At the same time, the time-out button is released by the mechanical interlock to permit that switch to return to its normal position in which its upper set of contacts is closed.

The mode of operation is best described in greater detail in conjunction with a particular switch construction chosen to illustrate this time-out control feature. However, it will be understood that the invention is not limited to the particular form and arrangement of switch construction shown in Fig. 7, as other forms and arrangements, differing as to details, may be employed for the same purpose.

The time out switch controlled by push button 102 is a double throw switch having two poles or contacts that are bridged by washer 106 when the push button is in inactive or raised position, and having three contacts that are bridged by washer 108 when the push button is depressed. The washers are carried by the switch actuator 110 which is mounted in insulating support 112. The start switch is similarly mounted, but employs only the single set of contacts engaged by washer 114 when the button 104 is depressed by the operator.

To provide the requisite interlock above referred to, the actuator 110 of the time out switch is provided with a circumferential recess or slot 118, while the actuator 120 of the restart switch is provided with a recess shaped to define a sloping cam surface 122. Intermediate the two actuators 110 and 120 the body of the support 112 is recessed to receive an interlock member 124 pivotally mounted on screw 126. A torsion spring 128 is arranged to urge the interlock member against the actuator 110.

By this arrangement, when the time out push button 102 is depressed by the operator at the commencement of an inoperative period that is not to be accounted for, the circuit included by the upper set of contacts is opened and the lower set of contacts is closed. As the switch reaches its lowermost position, the interlock member is caused under the urging of the torsion spring to enter the slot 118, thereby preventing the switch from releasing. At the same time, the other end of the interlock member rotates into the recess in the restart switch actuator 120. The interlock member holds the time out switch in its down position throughout the time the operator is inactive, with the circuits represented by the lower set of contacts serving to maintain the "operate" marking coil energized and the timer drive motor 40 running, just as if the machine were in normal operation.

Upon the expiration of the operator's voluntary time out period, the machine is restored to operation by pressing the restart button 104. Unlike the other push buttons of the apparatus, actuation of the button 104 does not place on the record medium any information concerning the period of no production. Instead, the switch 104, when pressed, serves to release the interlock member from locking engagement with the slot 118 in the time out actuator 110. Also, the contacts of the restart switch are closed momentarily, thereby serving to reclose the motor circuit of the machine through energization of the relay 64 with its contacts 86 in control of the motor start circuit. It will be apparent from the diagram, Fig. 2, that no marking pulse is applied to the heaters 50; the marking coil 82 that denotes normal operation remains energized.

While this time out feature is provided as an effective means for removing from the operator's mind the feeling of being under rigid surveillance at all times, nevertheless it will be recognized that use of the time out mechanism cannot be carried to an extreme, without being reflected in the operator's production record. As a result, the time out mechanism will in the majority of cases be used relatively sparingly, with the cause-recording mechanism primarily relied upon to indicate the various types of interruptions which the particular machine encounters during the working period.

While the above-described embodiment, incorporating the time out feature, provides a highly flexible system well suited to most industrial applications, nevertheless there may be types of operations where the same general principles of cause recording may be utilized in a slightly different manner. Such an embodiment is illustrated in Fig. 8. In this embodiment, the push-button actuation of the cause recording mechanism is employed, with electrical pulses automatically generated to produce substantially instantaneous marking of the record-receiving web.

As distinguished from the prior embodiment, both the start and stop buttons of the main motor control circuit are retained for controlling the operation of the machine. These switches, indicated at 140 and 142, control a relay 144 having the usual holding contacts in addition to the main contacts in the motor circuit. In this embodiment, the relay 150 which controls the application of the pulse of marking current to the coils 152 is provided with an additional set of contacts that are normally closed when the relay solenoid is deenergized. These additional contacts are connected in series with the circuit through motor stop switch 142 so that actuation of stop switch 142 or the energization of the relay 150 will break the holding circuit for relay 144 and stop the machine.

The marking circuit for indicating particular causes for interruption of machine operation comprises the series-connected heater units 152 similar to those already described, with push button switches 154. When a push button is depressed, current is supplied to the coil or coils included by the selected switch, the current flowing through resistor 156 via the upper set of contacts of relay 150. Upon the charging of solenoid-shunting condenser 158 by the rectified current through resistors 160 and 162 and rectifier 164, the relay 150 is energized to open the contacts and terminate the pulse of marking current, all as previously described.

In this embodiment, however, the actuation of a push button switch to indicate the reason for a delay serves to stop the machine. Accordingly, if an operator is to designate an interruption and the cause therefore, it must be done at the commencement of the period of interruption, if the full extent of the delay is to appear on the record. Otherwise, the record will continue to indicate normal operation of the machine, a situation which may not find support in the overall production record.

To bring about this mode of operation, the apparatus embodies a relay 170 the solenoid of which is connected in parallel with the solenoid of motor control relay 144 so as to be energized during operation of the machine. This relay forms a portion of the control circuit for relay 174 by which the energization of the "idle" and "operate" marking heaters 176 and 178, respectively, is determined. The heaters 176, 178 are supplied from a step-down transformer 180 through resistor 182, with the upper set of contacts of relay 174 arranged to energize the "idle" marker 176 when the relay is deenergized, and to supply current to the "operate" coil 178 when the relay solenoid is energized.

As has been indicated, the operation of this form of production analysis apparatus is arranged so that the operator may designate the cause of an interruption at the commencement of a delay period. Assuming that the machine has been in normal operation, with relays 144 and 170 energized, the "operate" coil 178 will be supplied with current to provide a continuous "operate" mark on the web as it is advanced by drive motor 182. The operator, in fact, may start and stop the machine at will, utilizing the start and stop switches 140, 142 in the usual manner, without affecting the indication of normal operation and without requiring the utilization of a cause-recording push button.

If, however, there occurs an interruption or stoppage beyond that normally encountered, the operator will advantageously have recourse to one of the push button switches 154, in order that the cause of the stoppage may be set forth on the record for the benefit of the management. If the machine has already stopped, the actuation of a cause-recording button will serve to place a mark indicative of the particular nature of the delay, as well as to indicate the time of commencement of the delay period. At the same time, the relay 174 is energized by the brief closing of relay 150 to transfer from the "operate" to the "idle" marking coils of the continuous marginal marking means. Relay 174 remains energized throughout the idle period by reason of the holding circuit provided by relay 170 in its deenergized condition.

Upon the termination of the period of interruption, the operator restarts the machine by actuating start button 140, which closes the motor circuit and relay holding circuit, and at the same time actuates relay 170 to deenergize relay 174 and transfer the steady marking current from idle coil 176 to operate coil 178, thus indicating the end of the idle period.

It will be observed that the operator may, if desired, utilize a cause recording button to stop the machine at the beginning of a delay period, while at the same time indicating the particular reason for the delay. Thus, if the forthcoming delay is to be attributed to lack of materials, the operator may, upon the completion of the final operation, select and actuate the button marked with a legend or designation indicative of that reason. Such actuation will energize briefly the marking relay 150, thereby breaking the holding circuit for the main motor relay 144 and stopping the machine simultaneously with the indication on the recording web of the commencement of a delay period attributable to that cause.

From the foregoing description, it is apparent that what has been provided is a novel form of recording apparatus wherein the operator of a machine is enabled readily to indicate the nature and causes of interruptions and delays in machine operation, so that, in particular, those interruptions which are beyond his control may be brought to the attention of management. On the other hand, the apparatus is so arranged that the operator is allowed to have a considerable degree of control over the instrument, so as to provide freedom of action within the area of his own responsibility. As a result, there is afforded, under usual conditions, a substantial amount of useful information as to machine operation and management effectiveness, without giving rise, in the mind of the operator, to the feeling that he is under rigid and critical supervision as to his own actions and performance.

It will be evident that the embodiments herein described represent specific but by no means exclusive forms of the invention, and the invention is to be understood as comprehending other forms and arrangements within the scope of the appended claims.

I claim:

1. Recording apparatus for indicating the nature and duration of interruptions in machine operation, comprising means for advancing a record-receiving medium at a timed rate of advance, a circuit for connection to the motor circuit of the machine and responsive to machine starting and stopping, marking means controlled by said circuit for placing on the record marks identifying normal operation of the machine and interruptions therein, means actuable by the operator for placing on the web marks identifying the causes of interruption in machine operation, a restart circuit in control of machine restarting following an interruption, connections between the cause-identifying means and the restart circuit for restarting the machine upon actuation of said cause-identifying means, supplemental switching means under the control of the operator for causing the recording apparatus to record normal operation upon stopping the machine to allow operator time out without recording down time, and a restart switch for restarting the machine and for restoring the recording apparatus to normal recording relation with the machine motor circuit.

2. Recording apparatus for indicating the nature and duration of interruptions in machine operation, comprising means for advancing a record-receiving medium at a timed rate of advance, a circuit for connection to the motor circuit of the machine and responsive to machine starting and stopping, marking means controlled by said circuit for placing on the record marks identifying normal operation of the machine and interruptions therein, means actuable by the operator for placing on the web marks identifying the causes of interruption in machine operation, a restart circuit in control of machine restarting following an interruption, connections between the cause-identifying means and the restart circuit for restarting the machine upon actuation of said cause-identifying means, supplementary switching means under the control of the operator connected with the motor control circuit of the machine and with the marking means controlled by said circuit for stopping the machine while retaining the marking means in condition to denote operation of the machine, and a restart switch for restarting the machine and for restoring the recording apparatus to responsive relation to machine start and stop.

3. Recording apparatus for indicating the nature and durations of interruptions in machine operation comprising means for advancing a record-receiving medium at a timed rate of advance, a plurality of push-button switches for selective actuation by the operator of the machine, means under the control of said switches for placing on the web identifying marks correlated with the selected push-button, a motor control circuit associated with each of said push buttons for connection to the motor starting circuit of the machine for restarting the machine, following an interruption, upon actuation of a selected switch to place a cause-identifying mark on the web, marking means connected with the motor control circuit for placing a mark on the web whenever said circuit is energized to maintain the machine in operation, and supplementary switching means under the control of the operator for interrupting the motor circuit to stop the machine while maintaining the marking means operative to mark the web as for normal machine operation, said supplementary switching means having normally-closed contacts in control of the machine motor circuit, normally-open contacts in control of the recording means to cause recording of marks denoting normal machine operation independently of machine motor stoppage, latching means for retaining the switch in actuated position when actuated by the operator to provide time out, and restart means for restarting the motor and for releasing the latching means to restore the supplementary switch to normal position.

4. Recording apparatus for indicating the nature and durations of interruptions in machine operation comprising means for advancing a record-receiving medium at a timed rate of advance, a plurality of push-button switches for selective actuation by the operator of the machine, means under the control of said switches for placing on the web identifying marks correlated with the selected push-button, a motor control circuit associated with each of said push buttons for connection to the motor starting circuit of the machine for restarting the machine, following an interruption, upon actuation of a selected switch to place a cause-identifying mark on the web, marking means connected with the motor control circuit for placing a mark on the web whenever said circuit is energized to maintain the machine in operation, and supplementary switching means, said switching means including a first switch member under the control of the operator for interrupting the motor circuit to stop the machine while maintaining the marking means operative to mark the web as for normal machine operation, said member having means for locking the member in actuated position, a second switching member having contacts in control of motor restart, and means interconnecting said first and second members to release the first member from locked position upon actuation of the second member by the operator to restart the machine.

References Cited in the file of this patent

UNITED STATES PATENTS

| | | |
|---|---|---|
| 1,306,631 | Rogers | June 10, 1919 |
| 1,415,499 | Tuttle | May 9, 1922 |
| 1,765,205 | Chapman | June 17, 1930 |
| 2,153,317 | Sigo | Apr. 4, 1939 |
| 2,307,487 | Chilberg et al. | Jan. 5, 1943 |
| 2,404,975 | Mathes | July 30, 1946 |
| 2,527,405 | Doherty | Oct. 24, 1950 |
| 2,557,196 | Nelson | June 19, 1951 |
| 2,591,124 | Boyan | Apr. 11, 1952 |
| 2,647,033 | Faus | July 28, 1953 |